(12) United States Patent
Djurdjevic

(10) Patent No.: US 9,591,300 B2
(45) Date of Patent: Mar. 7, 2017

(54) VIDEO STREAMING AND VIDEO TELEPHONY DOWNLINK PERFORMANCE ANALYSIS SYSTEM

(71) Applicant: Spirent Communications, Inc., Sunnyvale, CA (US)

(72) Inventor: Predrag Djurdjevic, Fort Worth, TX (US)

(73) Assignee: SPIRENT COMMUNICATIONS, INC., Sunnyvale, CA (US)

( * ) Notice: Subject to any disclaimer, the term of this patent is extended or adjusted under 35 U.S.C. 154(b) by 69 days.

(21) Appl. No.: 14/667,557

(22) Filed: Mar. 24, 2015

(65) Prior Publication Data

US 2016/0165226 A1   Jun. 9, 2016

Related U.S. Application Data

(60) Provisional application No. 62/087,744, filed on Dec. 4, 2014.

(51) Int. Cl.
| | |
|---|---|
| *H04N 5/357* | (2011.01) |
| *H04N 17/00* | (2006.01) |
| *G06T 7/00* | (2006.01) |
| *H04N 21/442* | (2011.01) |

(52) U.S. Cl.
CPC ......... *H04N 17/002* (2013.01); *G06T 7/0018* (2013.01); *H04N 5/357* (2013.01); *H04N 17/004* (2013.01); *H04N 21/442* (2013.01)

(58) Field of Classification Search
None
See application file for complete search history.

(56) References Cited

U.S. PATENT DOCUMENTS

| | | | |
|---|---|---|---|
| 4,991,007 | A | 2/1991 | Corley |
| 5,181,098 | A | 1/1993 | Guerin et al. |
| 5,351,201 | A | 9/1994 | Harshbarger, Jr. et al. |
| 6,542,185 | B1 | 4/2003 | Bogardus |
| 2004/0066454 | A1* | 4/2004 | Otani ................. G01C 11/06 348/188 |
| 2004/0085256 | A1 | 5/2004 | Hereld et al. |
| 2005/0020357 | A1 | 1/2005 | Oe |
| 2007/0091201 | A1 | 4/2007 | Sasaki |
| 2007/0091334 | A1 | 4/2007 | Yamaguchi et al. |
| 2010/0157047 | A1 | 6/2010 | Larkin et al. |

(Continued)

OTHER PUBLICATIONS

U.S. Appl. No. 14/667,540—Notice of Allowance dated Mar. 1, 2016, 16 pages.

(Continued)

*Primary Examiner* — Eileen Adams
(74) *Attorney, Agent, or Firm* — Haynes Beffel & Wolfeld LLP

(57) ABSTRACT

The technology disclosed relates to scoring user experience of video frames displayed on a mobile or other video display device. In particular, it relates to capture alignment and test stimulus isolation techniques that compensate for artifacts in the capture mechanism. The technology disclosed includes methods and systems for analyzing both downlink and uplink quality for mobile or other video display device cameras capturing and transmitting video frames including teleconference video display. Particular aspects of the technology disclosed are described in the claims, specification and drawings.

25 Claims, 9 Drawing Sheets

Downlink Performance Analysis Environment

(56) References Cited

U.S. PATENT DOCUMENTS

| | | | |
|---|---|---|---|
| 2010/0309231 A1 | 12/2010 | Stauder et al. | |
| 2011/0102602 A1 | 5/2011 | Leventu et al. | |
| 2013/0305106 A1 | 11/2013 | Mittal et al. | |
| 2014/0176730 A1* | 6/2014 | Kaji | H04N 9/3185 348/189 |
| 2015/0135209 A1* | 5/2015 | LaBosco | H04N 21/43635 725/31 |
| 2015/0279037 A1* | 10/2015 | Griffin | G06T 7/0024 345/1.3 |

OTHER PUBLICATIONS

Videoconferencing (VC), accessed Mar. 19, 2015, <http://en.wikipedia.org/wiki/Videoconferencing> pp. 4.

Xu, "Video Telephony for End-consumers: Measurement Stufy of Google+, iChat, and Skype," Networking, IEEE/ACM Transactions, vol. 22, Iss.3, 2014, pp. 17.

Castaner, "Why We Didn't Implement Mean Opinion Score (MOS) in Avalananche Adaptive Bitrate," Spirent Blogs, Nov. 30, 2012, pp. 5.

"8100 Mobile Device Test System UMTS Video User Expereince Module," SPIRENT Communications Inspired Innovation, Rev. A 07/08, 2008, pp. 2.

* cited by examiner

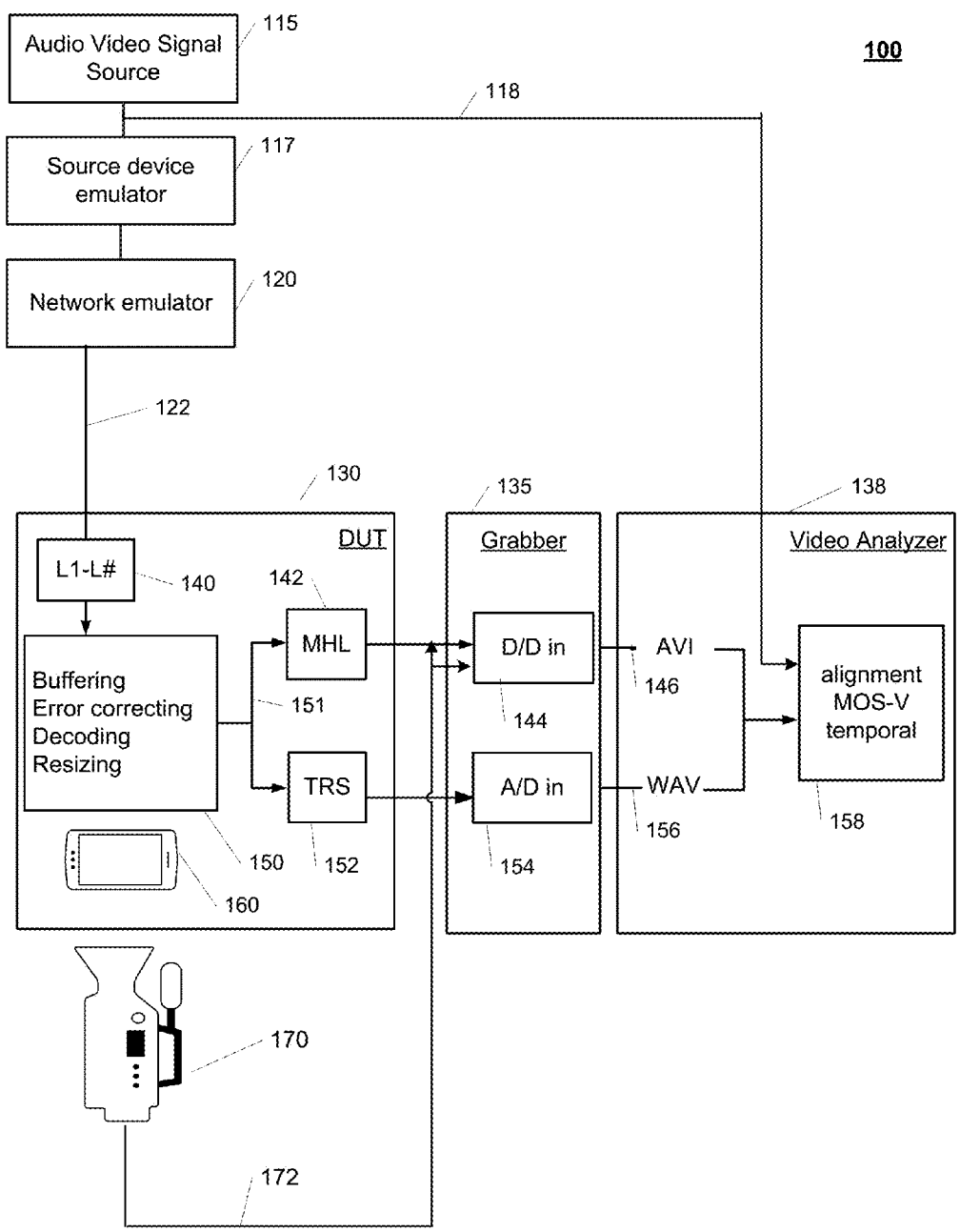
FIG. 1 Downlink Performance Analysis Environment

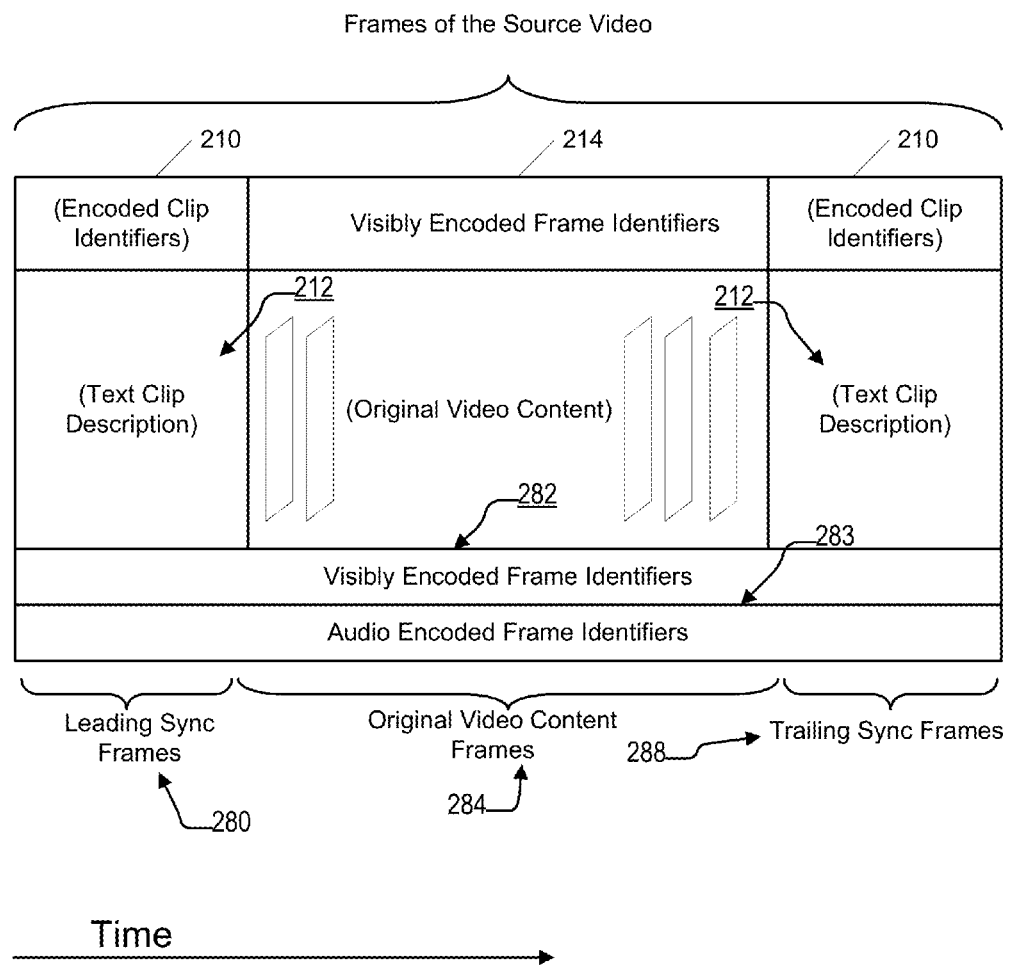
FIG. 2 Source Video Frame Processing

FIG. 3A Alignment Pattern
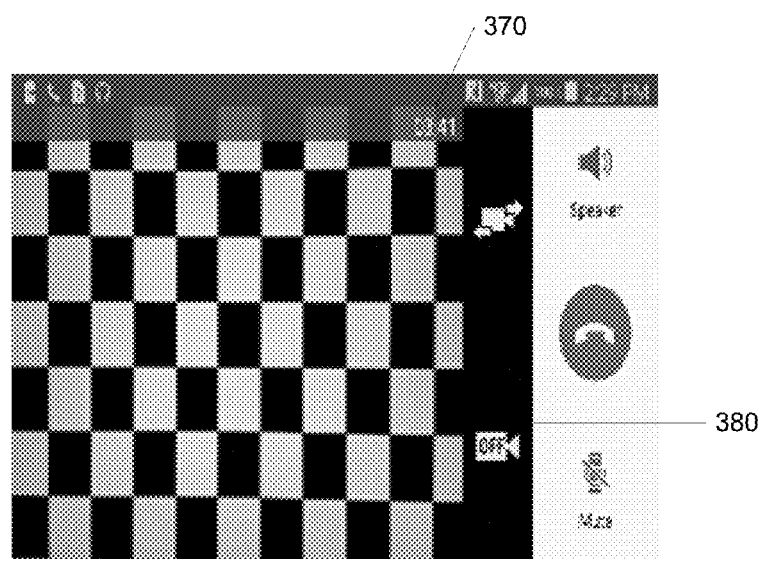
FIG. 3B Video Replay Image with Artifacts

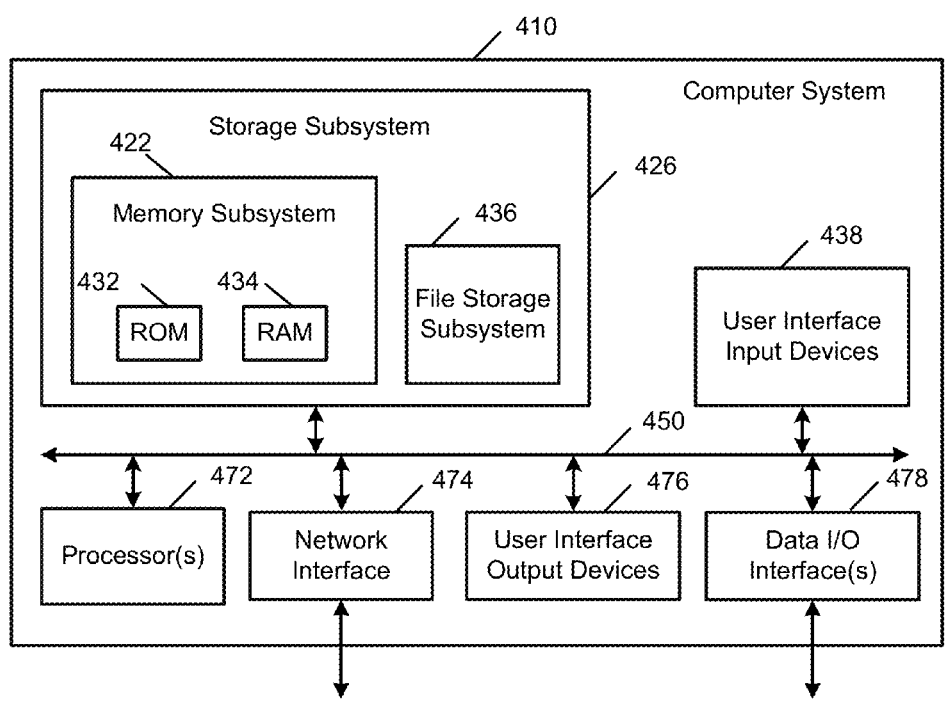
Fig. 4 Computer System

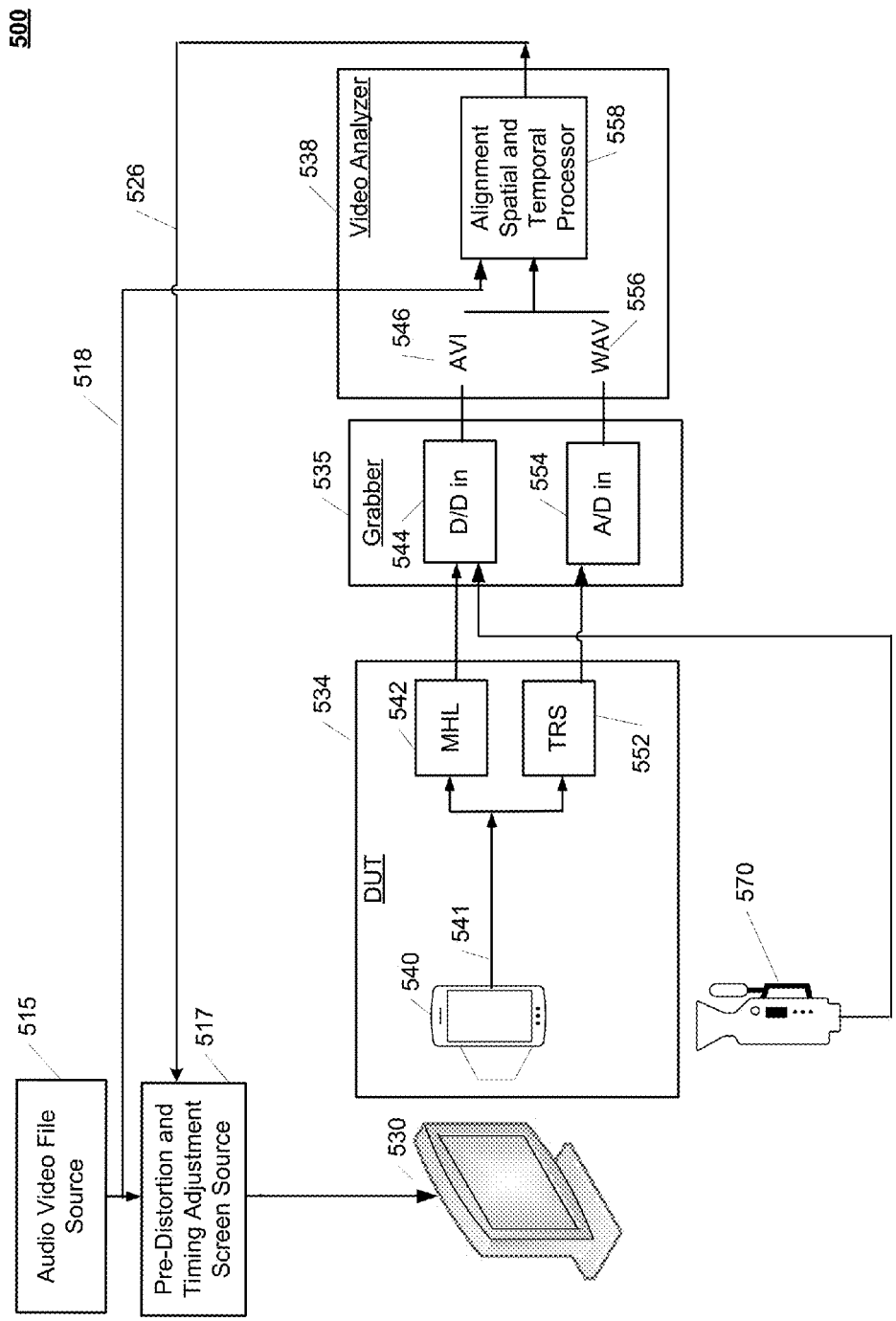
FIG. 5 Predistortion and Timing Adjustment Setup

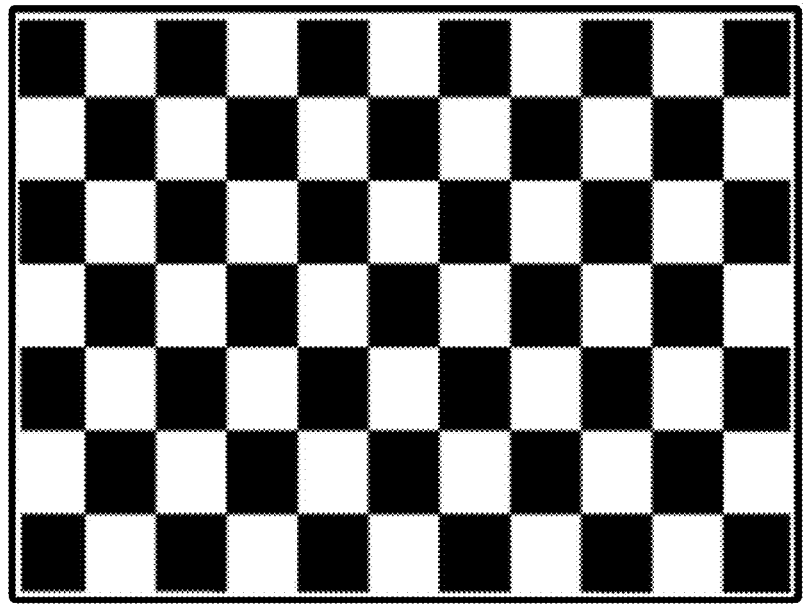
FIG. 6A Uncalibrated Video Input
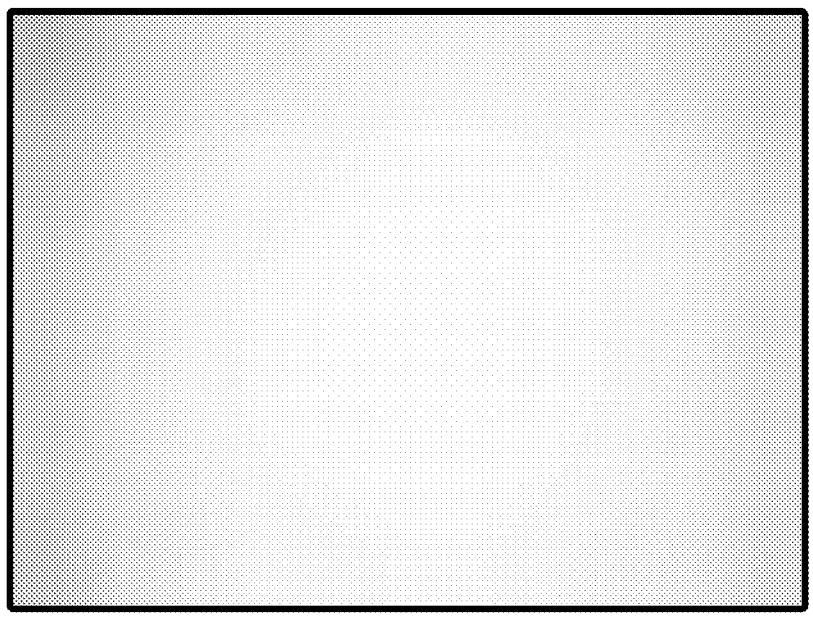
FIG. 6B Detected Light Falloff

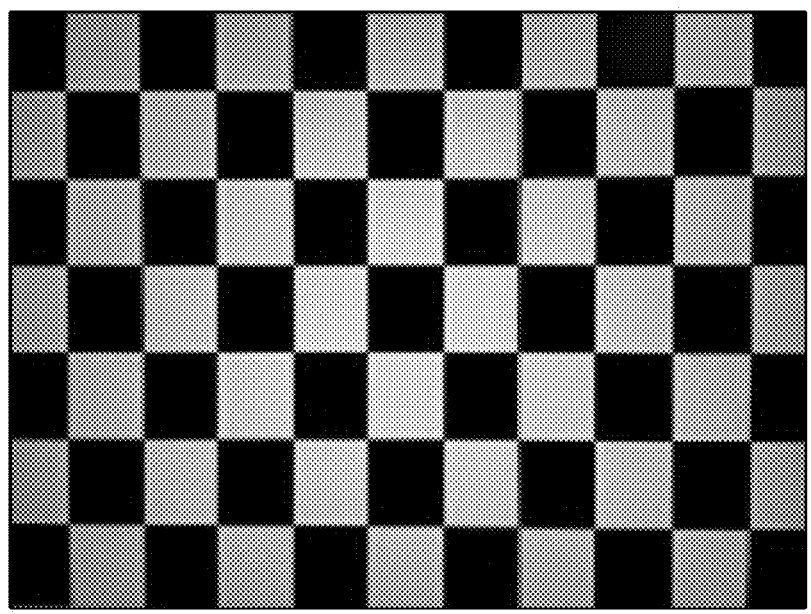
FIG. 6C Frame Capture of Uncalibrated Video Signal
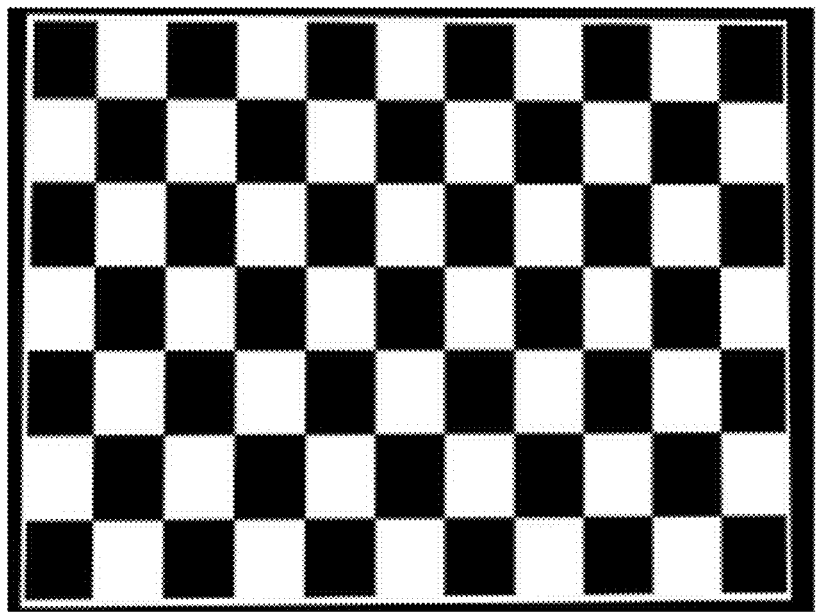
FIG. 6D Calculated Predistorted Frame

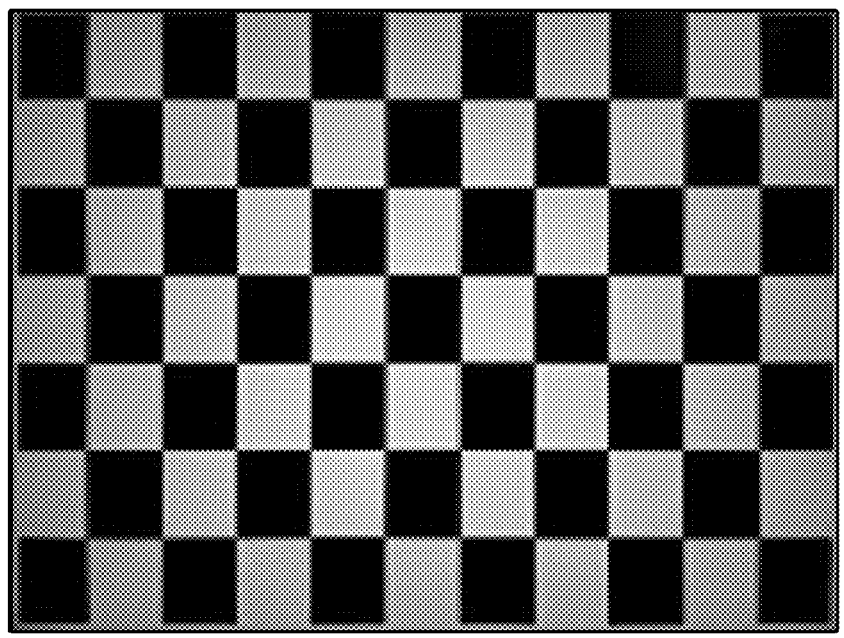
FIG. 7 Frame Capture of Calibrated Video Signal

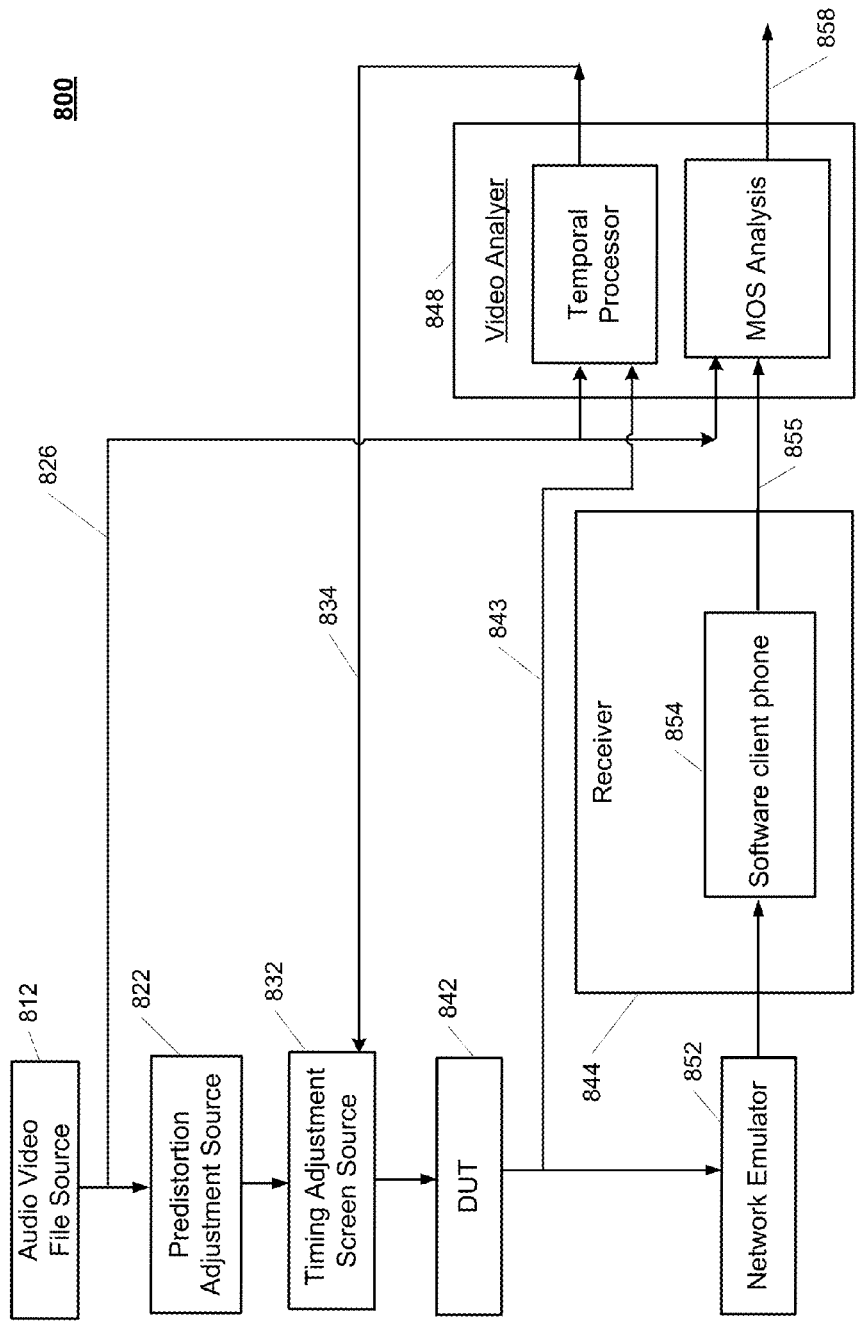
FIG. 8 Uplink Test Environment with Network Emulator

VIDEO STREAMING AND VIDEO TELEPHONY DOWNLINK PERFORMANCE ANALYSIS SYSTEM

RELATED APPLICATION

This application is related to and claims the benefit of U.S. Provisional Patent Application 62/087,744, entitled, "Video Streaming and Video Telephony Performance Analysis System," filed on Dec. 4, 2014. The provisional application is hereby incorporated by reference for all purposes. This application is related to U.S. application Ser. No. 14/667,540 entitled "Video Streaming and Video Telephony Uplink Performance Analysis System" by Predrag Djurdjevic filed concurrently with the application on Mar. 24, 2015 (now U.S. Pat. No. 9,380,297 issued Jun. 28, 2016).

BACKGROUND

The technology disclosed relates to user viewing experience of video as displayed on a device, and more particularly to capture alignment and test stimulus isolation techniques that compensate for artifacts in the capture mechanism.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Mobile multimedia applications are key contributors to growth and competitive differentiation among mobile operators and manufacturers. Market share for mobile and for teleconference video display devices is highly dependent upon on a positive user experience, which is often affected by a user's perception of video streaming and video telephony quality. The disclosed technology provides objective statistical estimates of the subjective end-user experience. Solutions are devised that make it possible to adequately emulate human perception in a controlled fashion, aggregating visual key performance indicators (KPIs) into a graded metric, sometimes as a mean opinion score (MOS).

In order for software algorithms that analyze the video streams to produce unbiased evaluations, the measurement system must provide a MOS-neutral capture workflow. Among the difficulties in capturing the video is establishing perfect spatial and temporal alignment between the mobile or other video display device rendering surface and the capturing instrumentation viewpoint. This alignment has historically required a mechanical hardware apparatus to fine tune 6 degrees of freedom (DOF) of video frame position. Another challenge is minimizing the lens distortions.

An opportunity arises to provide new and improved systems and methods for objectively testing and scoring a user's viewing experience when using smart phones, handheld devices and other portable devices that deliver viewing experiences via video frames.

SUMMARY

The technology disclosed relates to scoring user experience of video frames displayed on a mobile or other video display device. In particular, it relates to capture alignment and test stimulus isolation techniques that compensate for artifacts in the capture mechanism. The technology disclosed includes methods and systems for analyzing both downlink and uplink quality for mobile or other video display device cameras capturing and transmitting video frames including conference video display. Particular aspects of the technology disclosed are described in the claims, specification and drawings.

A variety of issues can be addressed by implementations of this technology. For example, the disclosed solution provides a more elegant, manageable and accurate means of capturing the video from devices, so is conducive for mobile and other video display device application testing. Also, the disclosed video and audio capture and analysis techniques address a need of video and audio performance labs for field testing.

BRIEF DESCRIPTION OF THE DRAWINGS

FIG. 1 is an example system used to capture and analyze downlink video from a mobile or conference video display device.

FIG. 2 shows processing of frames of a source video.

FIG. 3A is an example of a checkerboard alignment pattern and a visually coded image that can be used as a mobile or other video display device video image test input.

FIG. 3B is an example of a video replay image that includes artifacts introduced by the mobile or other video display device.

FIG. 4 is a simplified block diagram of an example computer system.

FIG. 5 is an example system used to set up predistortion and timing adjustments for capturing video and analyzing video uplink quality for a mobile or other video display device camera.

FIG. 6A is an example uncalibrated input video signal frame.

FIG. 6B is an example of a detected light falloff pattern.

FIG. 6C is an example of a frame capture of an uncalibrated video signal.

FIG. 6D shows an example of a calculated predistorted frame.

FIG. 7 shows a predistorted frame, as displayed on a mobile or other video display device camera and captured by an external video camera.

FIG. 8 is an example system used to analyze video uplink quality.

DETAILED DESCRIPTION

The following detailed description is made with reference to the figures. Preferred embodiments are described to illustrate the technology disclosed, not to limit its scope, which is defined by the claims. Those of ordinary skill in the art will recognize a variety of equivalent variations on the description that follows.

Increasingly, personal devices such as modern smart phones employ multimedia applications which include extensive use of video frames. The technology disclosed includes electronically capturing rendered video via a high definition multimedia interface (HDMI). Two examples of wired HDMI interfaces are mobile high-definition link (MHL) and SlimPort, an interface based on the Mobility DisplayPort standard. An example of a wireless HDMI interface is Miracast, a peer-to-peer wireless screencasting standard. Miracast can operate by forming a direct Wi-Fi connection with a dongle mounted in an HDMI port of a display. Chromecast is another peer-to-peer wireless screencasting protocol. Apple TV and DLNA also support peer-to-peer wireless screencasting. The disclosed technology also includes capturing rendered video via other technology that implements the HDMI specification, which specifies multiple modes of uncompressed digital video out (often called "clean HDMI"). Cabled HDMI is preferred to wireless HDMI to eliminate noise introduced by communication with the mobile or other video display device video under test (DUT), which cannot readily be separated from the reproduction being tested. In some camera based implementations, Camera Link, GigE, or USB 3 could be used to capture the rendered video.

The motivations for evaluating larger devices used for video conferencing are similar to the reasons for testing mobile device video downlink and uplink performance quality. Video conferencing makes uses of a video display. A range of displays and cameras are in use with the codec and transmission interfaces of video conferencing hardware on a desktop or laptop. Some of the performance bottlenecks differ due to more or less computing power, and more or less reliable connections when employing different transmission technologies across a range of devices.

The technology disclosed makes it possible to bypass capture impairments, such as mechanical hardware fixtures that must fine tune in 6 degrees for freedom (DOF) to establish spatial and temporal alignment between the mobile or other video display device rendering surface and the capturing instrument viewpoint. The technology disclosed uses software to align the original video content and rendered video, in support of analyzing video streams to produce unbiased evaluations.

The technology disclosed does not depend on projection or capture lenses, avoiding projective transformation and lens distortion that occur in the analog domain when optically capturing the appearance of an LCD or LED screen. For example, lens distortion causes squares to appear slightly spherical with a wide angle lens effect. These lens distortions are not present in HDMI captured images, without projection or capture lenses.

In an alternative, analog implementation, a camera can be used to optically capture the appearance of the LCD or LED screen. This can produce lens distortion. The known checkerboard alignment pattern described below can be applied to compensate and to calculate a correction for the lens distortion from the test pattern. In both implementations, a region of interest is established.

To detect and compensate for extrinsic and intrinsic device characteristics, a known checkerboard pattern can be streamed to the device. The test system can compare the known input to the output received via HDMI output to establish a region of interest (ROI) of the rendered media. Establishing a ROI is important because mobile device rendering of video typically includes graphical elements that are part of a mobile application GUI, as illustrated in FIG. 3B. The mobile device output adds elements to the video source before display. For example, frames, control buttons and menu option elements are typically part of the video output on a mobile device screen. These elements are treated as artifacts when the goal is to assess the quality of video replay or telephony on a mobile device. The establishment of a ROI for traditional desktop and laptop displays can include automated control of selection of a region of the display, to avoid variations over time from measurement to measurement, due to operator-selectable video display area in use. Alternatively full screen mode can be implemented for desktop and laptop video downlink and uplink measurements.

Environment and Video Signals

Turning to the figures, FIG. 1 illustrates a system implementation of the disclosed technology that accepts an audio video interleave (AVI) signal source 115, and a source device emulator 117 that transmits streaming video or simulated video telephony to a mobile or other video display device via a network emulator 120 that simulates a live cellular network. Some implementations of the technology disclosed could use a live network instead of a simulated network, but this compounds the potential sources of artifacts. Video streaming makes use of a unidirectional signal: for example the signals provided by Amazon, Netflix and YouTube. The source device emulator 117 can generate video telephony signals such as those used by IR.94, Skype, FaceTime and WebEx.

A device under test (DUT) 130 receives a streaming video or video telephony signal via the camera link interface signal 122 transmitted from the network emulator 120. The camera link interface signal 122 enters the DUT 130 and is received and processed by handlers at various layers of processing, including physical (OSI layer 1), data (L2), network (L3) etc. 140. Pre-processed input is transmitted to the DUT video processor 150. The DUT 130 is responsive to the camera link interface signal 122 that contains the frames and the corresponding audio, with DUT video processor 150 affecting the video and corresponding audio—buffering, error correcting, decoding and resizing the input streaming video or video telephony signal. An image is composed and rendered that includes at least parts of the original video, framing, controls and other artifacts related to the device's handling of the video.

The video output signal 151 passes through the MHL 142 to the video frame grabber 135. Alternatively, the video output could be transmitted wirelessly applying the Miracast or similar protocol. Audio signals can travel either with the video signal through the MHL 142, or through a tip ring sleeve (TRS) jack 152 to the video frame grabber 135. The video frame grabber 135 captures individual video frames from the video output signal 151, and can capture and digitize audio components received at an analog to digital converter A/D—in 154. While FIG. 1 shows a wired configuration, alternatively the DUT 130 can transmit signals via Wi-Fi to video frame grabber 135—for example via a Miracast dongle inserted into an HDMI of a display or TV.

An additional feature of the disclosed technology includes an option for video images displayed by a DUT camera 160 to be captured by an external video camera 170, and sent to the video frame grabber 135 for transmission to the video analyzer 538. The video analyzer 538 compares the signal received from the DUT 130 to the captured signal provided by the external video camera 170, which has known optical characteristics.

In telephony, camera lens performance can be evaluated: the camera lens of interest is on the device camera being evaluated, rather than an external camera that is used to capture output video. We compensate for relative positioning of external video camera 170 to phone screen on DUT 130; and also compensate for camera sensor and lens artifacts—via rectification based on a known black and white pattern, described further below. We later undistort the received camera signal, based on the established rectification, so that the received camera signal appears almost exactly the same as a signal received directly from a mobile device camera via MHL.

When an external video camera 170 is used for optical capture, an HDMI output of the camera 172 can be passed to the video frame grabber 135. Spatial, brightness and temporal distortions are inverted or compensated for, in this case, due to phone to camera pose, camera lens and sensor. The camera spatially and temporally oversamples the video by at least 2 times. Techniques for distortion inversion and compensation are further discussed below in the Uplink section of this disclosure.

The video frame grabber 135 sends digital video and audio to the video analyzer 138. The video quality analyzer can process both AVI 146 and WAV 156, digital formats. The grabber sends synchronized audio and video components; either when both audio and video are on the MHL channel or when the audio is separately delivered via the TRS channel.

The video analyzer 138 analyzes the alignment of the received video frames from the video frame grabber 135, comparing the received signals to a copy of the original AVI signal 118 from the AVI signal source 115. The MOS-V processor 158 analyses a region of interest (ROI) in the received video signal against the original source to determine whether and how the original source has been altered by the DUT 130.

Lens distortion and spatial aberrations, which occur as artifacts when a video is optically captured by a device camera or by a camera that captures images of a device display, can be detected and corrected as second order effects. Lens distortion can include barrel distortion in which image magnification decreases with distance from the optical axis. The apparent effect is that of an image which has been mapped around a sphere (or barrel). Fisheye lenses, which take hemispherical views, utilize this type of distortion as a way to map an infinitely wide object plane into a finite image area. For a zoom lens, barrel distortion appears in the middle of the lens's focal length range and is worst at the wide-angle end of the range. With pincushion distortion in a lens, image magnification increases with the distance from the optical axis. The visible effect is that lines that do not go through the center of the image are bowed inwards, toward the center of the image, like a pincushion.

Lens aberrations fall into two classes: monochromatic and chromatic. Monochromatic aberrations are caused by the geometry of the lens and occur both when light is reflected and when it is refracted. They appear even when using monochromatic light, hence the name. Chromatic aberrations do not appear when monochromatic light is used; they are caused by dispersion, the variation of a lens's refractive index with wavelength.

Before measuring link quality, projective transformations are made to adjust the image to compensate for physical alignment, lens and timing issues introduced by the measurement system. The idea is to post-undistort a video signal in a way that generates an aligned, correctly sampled video signal. Also, the distortion geometry can be adjusted: rotating the image very slightly and recalculating the black and white block sizes and shapes. Light falloff and color equalization are adjusted as well by brightening the squares that previously appeared dim in the uncalibrated video output frame. Video post-processing gets applied to compensate for variations in luminosity (light falloff), misalignment between the camera's image capture plane and the DUT camera screen's image display plane, and as a timing reference input. That is, output signal rectification can neutralize the effects of relative camera-to-phone positioning and inherent camera sensor and lens impairments. The technology disclosed can be applied to compensate for distortion geometry and light falloff, as described further below.

Video Downlink Quality

FIG. 2 illustrates an implementation of the temporal format of the frames in the sequence 200 of an example input video to be transmitted by the network emulator 120 to the DUT 130. The source video is designed to automatically establish a ROI of the rendered region. For instance, a simulated video conference image can be created using an IR.94 (or H.323) video client and camera.

The sequence 200 includes leading and trailing sync frames 280, 288 before and after original video content frames 284. The leading and trailing sync frames 280, 288 can be used to determine where in the sequence 200 the original video content frames 284 begin and end.

The sync frames 280, 288 include visibly encoded frame identifiers 282. The sync frames 280, 288 also include visibly encoded clip identifiers 210 indicating the properties of the source video such as clip ID, clip length, clip frames per second, etc. The sync frames 280, 288 can also include human readable text 212 of the properties of the source video to provide visual verification of the source video. Thus, the sync frames 280, 288 can serve as content space for the source video properties, and to allow possible video controls (play, pause, stop, etc.) to flash up on the screen.

In the illustrated implementation the leading and trailing sync frames 280, 288 have a dark background color. An assortment of colors can be used.

The original video content frames 284 include the visibly encoded frame identifiers 282 that distinguish among the frames. The visibly encoded frame identifiers 282 are in a predetermined sequence that can be decoded by video analyzer 138 to identify the frames in the captured content frames that correspond to the frames of the original video content frames 284. Sequences of frame identifiers such as a Gray code can be used to enhance frame identification and guard against errors. The visibly encoded frame identifiers 282 can be used for timing-related measurements. A comparison between the timing at the video signal source and the timing at the video signal destination is used to create a profile of the delay over time for frame receipt. In addition to measuring absolute delay, the profile can be used to measure jitter—a measure of how much the delay fluctuates over time. That is, jitter is a measure of how much the adjusted frame delay varies from a mean value. Additionally, frame loss of complete video frames can be analyzed, as well as frame freezing, which is a result of a single frame being repeated.

FIG. 3A shows a known checkerboard alignment pattern 360 that is streamed into the device under test (DUT) 130. Visibly encoded frame identifiers 282 are added for 1-2 seconds early in the video content to detect the region of interest (ROI) and to aid in the identification of extraneous features, such as those added by a mobile device. This visible encoding and streaming process also makes it possible to detect when a 90 degree rotation is introduced by a mobile device.

During playback and capture of content in a field scenario, translational image stabilization can be achieved using feedback from the video analyzer 138 which detects and analyzes the position of the blocks of visibly encoded frame identifiers 282. In one form, the visibly encoded frame identifiers 282 are coded dark and light pixel blocks that represent identify frames in a sequence. The identifiers also can encode a sequence of numbers or codes, which may correspond to timing information. The identifiers encoded can be a natural sequence of numbers (e.g., 1, 2, 3), a pseudo random sequence, a Gray code, or another predetermined sequence.

Referring to FIG. 3A, in the illustrated implementation the visibly encoded frame identifiers 282 are a pseudo random number sequence which is visibly encoded into a binary number and added to the frames. In the implementation of FIG. 3A, the visibly encoded frame identifiers 282 are a series of lighter colored shapes on a darker background. The darker and lighter regions of the visibly encoded frame identifiers 282 provide a high level of contrast between the pixels, which aids in decoding of the visibly encoded frame identifiers 282. Alternatively, the visibly encoded frame identifiers 320 may be encoded using a technique of alternating patterns and fills, or contrasting bright images.

Input frames of the checkerboard alignment pattern 360 shown in FIG. 3A can also be compared to output frames of the same pattern, to distinguish video output that includes artifacts. FIG. 3B shows an example of these artifacts, such as a superimposed time stamp 370 and a control signal such as a record image 380, introduced by a device. A comparison of the input signal to the captured signal identifies vestiges not part of the input video.

The pseudo random number sequence is a sequence of numbers that approximates the properties of random numbers. The sequence is not truly random in that it is completely determined by initial values. Using a pseudo random number sequence results in a relatively large number of bits changing between successive frames in the sequence 200, which increases the variation and reduces the chance of misidentifying the frames. A sparse or spread code can be used to control the changes in bit values from symbol to symbol. Alternatively, a Grey code could be used, with less entropy in the number of bits changing from frame to frame.

The random sequence can be generated in any convenient way. The pseudo random number sequence may have a cycle length that is longer than any expected sequence of dropped or skipped frames. With a long sequence, the visibly encoded frame identifiers 282 are unique to each of the frames, with informational sparsity of few bits and a repetition of a sequence after several minutes.

In addition to the illustrated bright and dark patches (like a bar code), other techniques may be used for visibly encoding frame identifiers. For example, video frame identifiers and detection based on changing spatial symbols or color patches can be used.

In FIG. 3A the frame identifiers are encoded at the upper and lower edges of the frames. More generally, the frame identifiers can be encoded in any area of the frame.

In the illustrated implementation, the visibly encoded frame identifiers 282 are applied to each of the frames of the original video content frames and the leading and trailing sync frames 280, 288. In alternative embodiments, the visibly encoded frame identifiers may be applied to only some of the frames, and software can be used to count the non-coded frames. For example, a single frame not having a frame identifier bordered by one or more leading and trailing frames having frame identifiers can be reliably counted. More non-coded frames can be sandwiched between coded frames, but with a risk of miscounting of the non-coded frames, depending upon the sampling rate and the frame-to-frame variation.

Markers Timing-Related Measurements

Audio corresponding to the frames in the sequence 200 may include audibly encoded markers 283, which have an intended alignment with video frames in the sequence 200. The timing of the audibly encoded markers 283 on frames caught by the video frame grabber 135 can be compared with the visibly encoded frame identifiers 282 to determine the level of synchronization. The audibly encoded markers may be, for example, a pseudo random sequence audible blip applied periodically to the audio corresponding to the frames. One example of the periodicity of the applied blips is 1 second, although other periods such as 2.0, 0.5, 0.25 or 0.10 seconds may also be used.

Video Uplink Quality Analysis

The video telephony of a mobile or other video display device also can be evaluated. This involves two stages, to separately handle capture effects and transmission effects. Setting up clean video sourcing that compensates for camera capture artifacts involves predistorting and carefully timed display of a test image that the DUT captures. The predistortion causes the DUT to encode a captured image that closely matches the original source. The display timing reduces smear that would result if the display of the test image changed during a DUT frame capture. The second stage involves transmission of the encoded image from the DUT to a softphone. Setting up the first stage predistortion and timing effectively isolates transmission effects from capture effects.

In one implementation, for video telephony captured by a mobile or other video display device camera, video analysis can be used to establish baseline camera impairment that contributes to the overall uplink video MOS. (In telephony, camera lens and sensor performance can be evaluated: the camera lens of interest is on the device camera being evaluated, rather than a camera that is used to capture output video.)

FIG. 5 illustrates a setup for determining what predistortion and timing adjustments to make to a video input of a DUT, for the uplink quality test system. An audio video file source 515 provides a video signal to a predistortion and timing adjustment screen source 517 and sends the same input signal, in parallel, directly to the video analyzer 538 to be used as an uncalibrated comparison signal 518. The predistortion and timing adjustment screen source 517 accepts and analyzes a video feedback signal 526, and then transmits a predistorted video signal to a screen 530. The screen 530 displays the video.

A device under test (DUT) 534 device camera 540 captures and displays the video on the screen 530. An LCD, LED, OLED or other format of screen can be used. This disclosure alternatively refers it to as an image generator or image display. The video output signal 541, captured by the device camera 540, passes through the Mobile High-Definition Link (MHL) channel 542 to the video frame grabber 535. Audio signals travel either with the video signal through the MHL channel 542, or through a tip ring sleeve (TRS) channel 552 to the video frame grabber 535. The video frame grabber 535 captures individual video frames from the video output signal 541, and captures and digitizes audio components received at an analog to digital converter A/D in 554. While FIG. 5 shows a wired configuration, alternatively the DUT 534 can transmit signals via Wi-Fi to video frame grabber 535—for example via a Miracast dongle inserted into an HDMI of a display or TV.

The video frame grabber 535 sends the received digital video and audio from the device camera 540 to the video analyzer 538, which can process both AVI 546 and WAV 556, digital formats. The video frame grabber 535 sends synchronized audio and video components: either when both audio and video appear on the MHL channel 542, or when the audio is delivered separately via the TRS channel 552.

The video analyzer 538 compares the signal received from the device camera 540 to the source signal streamed as an uncalibrated comparison signal 518.

An additional feature of the disclosed technology includes an option for video images displayed on a device camera 540 to be captured by an external video camera 570, and sent to the video frame grabber 535 for transmission to the video analyzer 538. The video analyzer 538 compares the signal received from the device camera 540 to the captured signal provided by the external video camera 570, which has known optical characteristics.

In telephony, camera lens performance can be evaluated: the camera lens of interest is on the device camera being evaluated, rather than an external camera that is used to capture output video. We first establish the distortion from the screen 530 to the DUT 534. Then we calculate a predistorted frame for distortion from the DUT 534 to the external video camera 570, which is not as critical. The external video camera 570 is also spatially and temporally oversampled relative to the device camera 540.

FIG. 6A shows an example uncalibrated video input frame 600A. FIG. 6B shows detected light falloff pattern 600B when the uncalibrated video frame has been received and displayed on a device camera 540, as captured by an external video camera 570. Uncalibrated video input frame 600C in FIG. 6C shows a captured video signal as seen when an input signal, such as shown in example uncalibrated video input frame 600A, has not been predistorted.

Before testing uplink quality, projective transformations are made to adjust the image to compensate for physical alignment, lens and timing issues introduced by the system. The idea is to predistort a video signal in a way that generates an aligned, correctly sampled video signal at 541. FIG. 6D shows an example of a calculated predistorted frame, in which a checkerboard alignment pattern 360 is downsized to minimize clipping at the corners of a received video frame. Also, the distortion geometry gets adjusted: rotating the image very slightly and recalculating the black and white block sizes and shapes. This can be observed in the non-parallel edges of the detected light falloff pattern 600B. Light falloff and color equalization are adjusted as well by brightening the squares that previously appeared dim in the uncalibrated video input frame 600C. A video feedback signal 526 an output of the alignment spatial and temporal processor 558 gets applied as an input to predistortion and timing adjustment by screen source 517 to compensate for variations in luminosity (light falloff), misalignment between the camera's image capture plane and the screen's image display plane, and as a timing reference input. In this example implementation, we compensate for distortion geometry and light falloff.

The video analyzer 538 compares captured video frames from the video frame grabber 535, to the uncalibrated comparison signal 518 that has been transmitted to the video analyzer. The alignment spatial and temporal processor 558 analyzes a region of interest (ROI) in the captured video signal as compared to the source signal, for testing the video uplink quality. FIG. 7 shows an example captured frame 700 of a calibrated (predistorted) image, as displayed on a device camera 540, and captured by an external video camera 570. A visual comparison between the two captured video frames FIG. 6C for example uncalibrated video input frame 600A and FIG. 7 for the calibrated video signal reveals brighter, more luminous blocks with "straight" intersections between blocks when a predistorted signal is employed.

FIG. 8 illustrates an implementation of the disclosed technology: a "soft" uplink quality test system. An audio video file source 812 provides an input to a predistortion adjustment source 822 and sends a comparison signal 826 for reference, to the video analyzer 848. Note that predistortion adjustment preset values have already been determined using the predistortion and timing adjustment setup shown in FIG. 5, and discussed earlier. Timing adjustment screen source 832 receives and analyzes a feedback signal 834, and then transmits a predistorted video to a DUT 842, which transmits the received video signal 843 to the video analyzer 848 and to a network emulator 852. In this implementation, the receiver 844 includes a software client phone 854 that transmits a video signal 855 to the video analyzer 848 for testing. The video analyzer 848 compares the video signal 855 to the comparison signal 826 to analyze the uplink quality, producing final MOS results 858, for the DUT, that represent the video telephony upload performance.

Video uplink analysis includes a setup analysis. The video analyzer 848 establishes a region of interest (ROI), using elements of checkerboard and marker detection described earlier. In one example, a black and white flickering signal is displayed on the monitor, is monitored over a time interval of several seconds, and the differences are analyzed to identify a rectangular ROI. A feedback signal 834 gets applied as an input to timing adjustment screen source 832 to compensate for timing artifacts that affect the ability to test video uplink quality, as described above in the setup description of FIG. 5.

In one example, video signal frame transmission is adjusted in time to minimize a smearing artifact that results when the sample rate for a phone camera is 15 frames per second, while the refresh rate of the image display may be 60 frames per second. This disparity results in 4 repeated AVI file frames for the image display per optical signal received by the phone camera from the image display. To adjust for a smearing artifact caused by the need to synchronize the refresh rate of the display with the camera capture, the time when frames transition between black and white on a checkerboard being displayed on the screen can be adjusted to a time when the receiving camera is "not looking". While playing a stimulus video, frame marker intensity (greyness) can be analyzed to determine which frame is being captured. An algorithm can dynamically retard or advance the number of video refresh cycles that play which checkerboard value in the original AVI file. For example, for the screen display with a 60 Hz refresh rate (producing an image 60 times per second), the algorithm can control the input to the display so that the switch between white and black occurs once per 60 cycles, 120 cycles, or 240 cycles—with the transition calculated so that the display input changes between the times when the camera on the DUT samples.

For example, for determining a ROI: if a frame of the visibly encoded frame identifiers 282 (the bottom pattern on the video) is represented by 30 bits, we may choose to change 9 bits between frames. Sequence-spread codes (sparse encoding) ensure that the distances between successive points have minimum and maximum values. In one example, the consecutive frame codes are at least 9 bits apart from each other but no more than 15 bits, to generate some spreading or redundancy in the code, while avoiding big distances or changes. This choice of encoding avoids depleting the pool of unique codes; and the encoder does not artificially degrade an area and/or increase the bandwidth required to represent the video, as compared to the video with no imprinting.

Uplink quality measurement can also include identifying dropped packets. RTP, the real-time transport protocol, provides end-to-end network transport functions suitable for applications transmitting real-time video data (as well as audio or simulation data) over network services. Several fields in RTP headers make it possible to develop a video coding strategy. According to RTP header format specification, the "sequence number" field increments by one for each RTP data packet sent. This field can be used by the receiver, for diagnostic purposes, to detect packet loss and restore packet sequence. For example, a flight of packets with consecutive sequence numbers can be inferred to carry the same timestamp. If a packet is the last one in a frame, then its "marker" field is set to 1; otherwise the value is 0, so the "marker" field can be used to identify the boundary between two adjacent video frames. Since different machines use different initial sequence numbers, to match video frames between the sender and receivers, one can instead use the "timestamp", "marker" and "length" fields in algorithms to detect dropped frames.

In one implementation of uplink quality measurement, the timing, frame loss and freezing is measured by examining the end image frames that software client phone 854 provides as it decodes RTP format into AVI format, and then producing final MOS results 858 for the DUT.

Computer System

FIG. 4 is a simplified block diagram of an implementation of the system 100 for capturing and analyzing video from a mobile or other video display device. The objective measure of user viewing experience can be implemented by a computer program stored in memory, or in other memory that can be distributed separately from the computer system as an article of manufacture.

Computer system 410 typically includes a processor subsystem 472 which communicates with a number of peripheral devices via bus subsystem 450. These peripheral devices may include a storage subsystem 426, comprising a memory subsystem 422 and a file storage subsystem 436, user interface input devices 438, user interface output devices 478, and a network interface subsystem 476. The input and output devices allow user interaction with computer system 410 and with a video frame grabber 135 and a video analyzer 138. Network interface subsystem 476 provides an interface to outside networks and devices of the system 100.

The physical hardware component of network interfaces are sometimes referred to as network interface cards (NICs), although they need not be in the form of cards: for instance they could be in the form of integrated circuits (ICs) and connectors fitted directly onto a motherboard, or in the form of microcells fabricated on a single integrated circuit chip with other components of the computer system.

User interface input devices 438 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include many possible types of devices and ways to input information into computer system 410.

User interface output devices 478 may include a display subsystem, a printer, a fax machine, or non-visual displays such as audio output devices. The display subsystem may include a flat panel device such as a liquid crystal display (LCD), light emitting diode (LED), organic light emitting diode (OLED), a projection device, or some other mechanism for creating a visible image. The display subsystem may also provide non visual display such as via audio output devices. In general, use of the term "output device" is intended to include many possible types of devices and ways to output information from computer system 410 to the user or to another machine or computer system.

The computer system further includes user interface output devices 478 for communication with the mobile or other video display device under test 130 via camera link interface signal 122.

Storage subsystem 426 stores the basic programming and data constructs that provide the functionality of certain implementation of the present invention. For example, the various modules implementing the functionality of certain implementations of the invention may be stored in a storage subsystem 426. These software modules are generally executed by processor subsystem 472.

Memory storage subsystem 426 typically includes a number of memories including a main random access memory (RAM) 434 for storage of instructions and data during program execution and a read only memory (ROM) 432 in which fixed instructions are stored. File storage subsystem 436 provides persistent storage for program and data files, and may include a hard disk drive, a floppy disk drive along with associated removable media, a CD ROM drive, an optical drive, or removable media cartridges. The databases and modules implementing the functionality of certain implementations of the invention may have been provided on a computer readable medium such as one or more CD-ROMs, and may be stored by file storage subsystem 436. The host memory storage subsystem 426 contains, among other things, computer instructions which, when executed by the processor subsystem 472, cause the computer system to operate or perform functions as described herein. As used herein, processes and software that are said to run in or on "the host" or "the computer", execute on the processor subsystem 472 in response to computer instructions and data in the host memory storage subsystem 426 including any other local or remote storage for such instructions and data.

Bus subsystem 450 provides a mechanism for letting the various components and subsystems of computer system 410 communicate with each other as intended. Although bus subsystem 450 is shown schematically as a single bus, alternative embodiments of the bus subsystem may use multiple busses.

Computer system 410 itself can be of varying types including a personal computer, a portable computer, a workstation, a computer terminal, a network computer, a television, a mainframe, or any other data processing system or user device. Due to the ever changing nature of computers and networks, the description of computer system 410 depicted in FIG. 4 is intended only as a specific example for purposes of illustrating implementations of the present invention. Many other configurations of computer system 410 are possible having more or less components than the computer system depicted in FIG. 4.

Some Particular Implementations

In one implementation, a method is described from the perspective of a system conducting a test of video decoding and reproduction. The method includes comparing source video content to rendering and display of the video by a mobile or other video display device. This method includes using a digital video output from the mobile or other video display device during a test to capture rendered content without lens distortion. In the disclosed method, the rendered content includes a visually encoded test pattern at a beginning of a source video and visually encoded timing marks during the source video. The disclosed method automatically establishes a region of interest that separates rendering of the source video from on-screen controls and framing added by a video playback system of the mobile or other video display device; and analyzes video playback quality in the region of interest.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The digital video output can conform to an HDMI standard. For some implementations, the method includes analyzing loss, freezing and jitter in frames of the rendered content. Such video or image jitter can occur when the video image frames are randomly displaced due to the delay and corruption of key and differential packets during video transmission.

The method can include analyzing distortion of the rendered content. A checkerboard test pattern can be used as an alignment pattern. Corners from the source video can be detected in the images of rendered content and correction calculated.

A 90 degree rotation between the source video and the rendered content version of the source video in the region of interest can be automatically detected and taken into account.

The method can be applied during the test to analyze a video telephony source video. The method also can be applied to analyzing a replay of the source video from a video streaming service, or a replay of the source video from a video test bed.

Other implementations may include a system including memory and one or more processors operable to execute instructions, stored in the memory, to perform a method as described above, or as follows.

Another implementation includes a test harness device that tests cellular video reception performance when coupled in communication with a cellular network emulator and a device under test (DUT). The device includes a network adapter that implements an interface to the cellular network emulator; and a digital video input interface that implements receiving a digital video signal output by the DUT that represents a display generated by the DUT including a received test video. At least one image processor is coupled to the network adapter and the digital video input interface. The image processor includes a source test video module that streams a test video signal over the network adapter to the cellular network emulator for delivery to the DUT. The test video output includes a region of interest pattern; and a region of interest module that processes the digital video signal from the DUT. The ROI module automatically detects the region of interest pattern and establishes a region of interest that separates rendering of the test video from on-screen controls and framing added by a video playback system of the DUT. A video playback quality module compares digital video input in the region of interest to at least a portion of the test video signal and scores video playback quality based at least in part on the comparison.

Other implementations rely on a camera to capture video from a mobile or other video display device. A method is described that includes comparing source video content to rendering and display of the video by a mobile or other video display device. This method uses a digital video output from a camera directed towards the display of the mobile or other video display device during a test to capture rendered content subject to lens distortion. In the disclosed method, the rendered content includes a visually encoded test pattern at a beginning of a source video and visually encoded timing marks during the source video. The disclosed method automatically establishes and rectifies a region of interest that separates rendering of the source video from on-screen controls and framing added by a video playback system of the mobile or other video display device; and analyzes video playback quality in the region of interest.

This method can use features described above in the context of a direct capture (no camera) method.

In one implementation, a method is disclosed that calibrates a target video source being captured by a camera incorporated in a DUT, in preparation for a video uplink quality test. This method includes transmitting data representing an initial test pattern to an image display; and receiving captured pattern data representing capture of the initial test pattern by the camera incorporated in the DUT. This method also includes calculating at least one transformation of the initial test pattern, based on comparison of the captured pattern data and the initial test pattern. The transformation predistorts the initial test pattern transmitted to the image display to scale and perspective-control the transmitted data to reduce differences between captured predistorted pattern data and the initial pattern data. Parameters of the transformation are stored. This method can include predistorting the test pattern using the stored parameters of the transformation; transmitting to the image display data representing the predistorted test pattern; and receiving the captured predistorted pattern data, representing capture of the predistorted test pattern by the camera incorporated in the DUT. Further, the method can include comparing the captured predistorted pattern data to the initial test pattern; and revising the transformation based on the comparison.

Corrections for framing errors, luminosity variation, and/or rotation corrections in the captured data can be included in the transformation method. The method can include a transformation that corrects for a difference between an image projection plane of the image display and an image capture plane of the camera in the DUT; and can include a transformation that corrects for lens distortion by the camera in the DUT.

One feature of the method disclosed includes further correcting for timing differences between the image display and the camera in the DUT. This method analyzes visually encoded test image sequences that are visually encoded with pixel blocks that represent a frame identifier; receives test sequence captured data, including the visual encoding; and evaluates the visual encoding in at least one frame of the test sequence captured data. The method further includes determining the mixing of color or luminosity between visually encoded pixel blocks for a first frame identifier value in a first frame and a second frame identifier value in a consecutive second frame. Based on the analysis, this method adjusts frame start of transmission to the image display. This has the effect of reducing the mixing of color or luminosity, thereby aligning the refresh of the image display with the frame capture of the DUT. For this method, the image display can have a refresh cycle at least twice as fast as a frame capture rate of the DUT. The adjustment of the frame start of transmission to the image display can be an integer number of image display refresh cycles.

Another implementation discloses a method of evaluating video telephony uplink performance with feedback that adjusts at least timing calibration during the uplink test. In this application, a device under test (DUT) incorporates a camera, which faces an image display. This method includes transmitting data representing a predistorted test sequence to the image display; receiving via an RF network, first pattern data from the DUT, representing capture of the predistorted test sequence by the camera incorporated in the DUT. And evaluating a first pattern data This method includes detecting visually encoded pixel blocks of a frame identifier; and aligning timing of transmitting the predistorted test sequence to the image display with capture by the camera incorporated in the DUT, based on analysis of the detected pixel blocks. This method further includes receiving and evaluating second pattern data from the DUT, representing capture of the predistorted and timing aligned test sequence by the camera incorporated in the DUT, including comparing frames of the second pattern data to a reference test sequence and scoring the comparison; and reporting at least one scoring of the comparison.

This method of evaluating video telephony uplink performance further includes correcting for timing differences between the image display and the camera in the DUT by evaluating the visually encoded pixel blocks for mixing of color or luminosity between code segments that encode a first frame identifier value in a first frame and a second frame identifier value in a second frame; and adjusting frame start of transmitting the predistorted test sequence to the image display to reduce the mixing of color or luminosity, thereby aligning the refresh of the image display with the frame capture of the DUT. This method also includes repeatedly evaluating the visually encoded pixel blocks and adjusting the frame start of transmitting the predistorted test sequence during the evaluation of the DUT. The image display can have a refresh cycle at least twice as fast as a frame capture rate of the DUT, and can further include adjusting the frame start of transmitting the predistorted test sequence to the image display by an integer number of the image display refresh cycles. For some implementations, the method includes analyzing jitter in frames of the rendered content, analyzing order of frame receipt and dropped frames, and analyzing mean option scores.

The received video can arrive via an emulated network in a lab. The physical layer of the network can be cellular, WiMax, or WiFi. The logical layer can be 802.x or cellular. The video also can arrive via a real network with similar physical and logical layers.

In one implementation, a system is disclosed for testing video uplink quality: a test harness device calibrates a video signal for testing cellular video capture and transmission performance when coupled in communication with a device under test (DUT). The device includes a predistortion processor coupled to a video source and to a display that stimulates a camera of the DUT; and includes a video analyzer coupled to the DUT, the video source, and the predistortion processor. The predistortion processor adjusts perspective of a test pattern from the video source and adjusts illumination values across the test pattern, responsive to the video analyzer. The video analyzer receives a signal representing capture by the DUT of an image from the display, and receives additional display elements added to the capture by the DUT. The video analyzer determines a region of interest within the signal. Further, the video analyzer compares a captured test pattern from the DUT to a reference test pattern, calculates a perspective adjustment of the test pattern that improves matching of the captured test pattern to the reference test pattern; and sends the perspective adjustment to the predistortion processor to apply to the test pattern and the video from the video source. The disclosed system further includes correcting for timing differences between the predistortion processor and the camera in the DUT. The video analyzer evaluates pixel blocks that visually encode a frame identifier, detecting mixing of color or luminosity between pixel blocks that encode a first frame identifier value in a first frame and a second frame identifier value in a second frame. The video analyzer sends frame start adjustment data to the predistortion processor, responsive to detecting the mixing of color or luminosity, to align the refresh of the image display with the frame capture of the DUT.

In another implementation, a system incorporates a camera in a test harness device to evaluate video for telephony upload performance of a device under test (DUT). This system includes a predistortion processor coupled to a video source and to a display that stimulates a camera of the DUT; and a video analyzer coupled to the DUT, the video source, and the predistortion processor. The predistortion processor adjusts frame timing responsive to the video analyzer, and adjusts perspective of a test pattern and illumination values across the test pattern responsive to perspective and illumination parameters. The video analyzer: receives via an RF network, video telephony data from the DUT; and evaluates first pattern data received from the DUT representing capture of the predistorted test sequence by the camera incorporated in the DUT. The evaluation includes receiving a signal representing capture by the DUT of an image from the display and additional display elements added to the capture by the DUT; and determining a region of interest within the signal. Further, the video analyzer evaluates second pattern data received from the DUT representing capture of the predistorted test sequence by the camera incorporated in the DUT, including: receiving and evaluating at least one frame with a frame identifier within the region of interest, wherein pixel blocks visually encode the frame identifier, determining a timing adjustment from mixing of color or luminosity between visually encoded pixel blocks of a first frame identifier value in a first frame and a second frame identifier value in a consecutive second frame; and sending the timing adjustment to the predistortion processor. The video analyzer evaluates third pattern data received from the DUT, representing capture of the predistorted and timing aligned test sequence by the camera incorporated in the DUT, including comparing frames of the second pattern data to a reference test sequence and scoring the comparison; and reports at least one evaluation scoring of the comparison. This system includes second and third pattern data that are parts of a same test video frame sequence, and can further include analyzing order of frame receipt and dropped frames. The system further implements analyzing distortion of the rendered content. The system can implement a checkerboard alignment test pattern; and can detect corners of the source video checkerboard alignment pattern in the rendered content.

Computer readable media implementations may include a non-transitory computer readable storage medium storing instructions executable by a processor to perform any of the methods as described above. Yet another implementation includes a non-transitory computer readable storage medium storing instructions combinable with a processor executable by a processor to produce a device that performs any of the methods described above. A non-transitory computer readable medium in this application and claim set does not include a transitory wave form.

I claim as follows:

1. A method of comparing source video content to rendering and display of the video by a video playback system of a device, including:
    during a test, capturing from the video playback system of the device digital video output of content rendered without lens distortion;
    wherein the rendered content includes a visually encoded test pattern at a beginning of a source video and visually encoded timing marks during the source video;
    automatically establishing a region of interest by separating the source video content rendered by the video playback system of the device from on-screen controls and from framing added by the video playback system of the device; and
    analyzing video playback quality in the region of interest that is devoid of on-screen controls and framing.

2. The method of claim 1, wherein the digital video output conforms to an HDMI standard.

3. The method of claim 1, further including analyzing loss, freezing and jitter in frames of the rendered content.

4. The method of claim 1, further including analyzing distortion of the rendered content.

5. The method of claim 1, wherein the test pattern is a checkerboard alignment pattern; and
    further including detecting corners of the source video checkerboard alignment pattern in the rendered content.

6. The method of claim 1, further including automatically detecting and taking into account 90 degree rotation between the source video and a rendered content version of the source video in the region of interest.

7. The method of claim 1, further including analyzing during the test a video telephony source video.

8. The method of claim 1, further including analyzing during the test a replay of the source video from a video streaming service.

9. The method of claim 1, further including analyzing during the test a replay of the source video from a video test bed.

10. A tangible computer readable medium loaded with instructions implementing the method of claim 1.

11. A test harness device that tests cellular video reception performance when coupled in communication with a cellular network emulator and a device under test (DUT), the device including:
    a network adapter that implements an interface to the cellular network emulator;
    a digital video input interface that implements receiving a digital video signal output by the DUT that represents a display generated by the DUT including a received test video;
    at least one image processor coupled to the network adapter and the digital video input interface, the image processor including:
        a source test video module that streams a test video signal over the network adapter to the cellular network emulator for delivery to the DUT, wherein the test video output includes a region of interest pattern;
        a region of interest module that processes the digital video signal from the DUT and automatically detects the region of interest pattern and establishes a region of interest by separating the test video content received from the source test video module from on-screen controls and from framing added by a video playback system of the DUT; and
        a video playback quality module that compares digital video input in the region of interest that is devoid of on-screen controls and framing to at least a portion of the test video signal and scores video playback quality based at least in part on the comparison.

12. The system of claim 11, wherein the digital video output conforms to an HDMI standard.

13. The system of claim 11, further implementing analyzing loss, freezing and jitter in frames of the rendered content.

14. The system of claim 11, further implementing analyzing distortion of the rendered content.

15. The system of claim 11, wherein the test pattern is a checkerboard alignment pattern; and
    further implementing detecting corners of the source video checkerboard alignment pattern in the rendered content.

16. The system of claim 11, further implementing automatically detecting and taking into account 90 degree rotation between the source video and a rendered content version of the source video in the region of interest.

17. The system of claim 11, further implementing analyzing during the test a video telephony source video.

18. The system of claim 11, further implementing analyzing during the test a replay of the source video from a video streaming service.

19. The system of claim 11, further implementing analyzing during the test a replay of the source video from a video test bed.

20. A non-transitory computer readable medium with instructions that combinable with a processor and memory coupled to the processor to produce the system of claim 11.

21. A method of evaluating rendering and display of video by a device under test, including:
    receiving images of a device display during rendering of video content by the device, the images captured using a camera;
    wherein the rendered video content includes at least one test pattern preface to a source video and visually encoded frame identifiers during the source video;
    automatically establishing a region of interest by separating the received images rendered as video content by the device from on-screen controls and from framing added by a video playback system of the device;
    automatically calculating a perspective adjustment from the test pattern within the region of interest; and
    applying the perspective adjustment and using the frame identifiers, analyzing video playback quality of the source video in the region of interest that is devoid of on-screen controls and framing.

22. The method of claim 21, further including automatically calculating from the test pattern a lens distortion correction and applying the lens distortion correction when analyzing the video playback quality in the region of interest.

23. The method of claim 21, further including based on the test pattern, calculating a luminosity variation correction and applying the luminosity variation correction when analyzing the video playback quality in the region of interest.

24. The method of claim 21, wherein the test pattern is a checkerboard alignment pattern; and
    further including detecting corners of the source video checkerboard alignment pattern in the rendered content.

25. A non-transitory computer readable media loaded with instructions that implement the method of claim 21.

\* \* \* \* \*